(12) United States Patent
Sun et al.

(10) Patent No.: US 9,706,503 B2
(45) Date of Patent: Jul. 11, 2017

(54) TRANSMISSION RANK SELECTION WHEN DEPLOYING A SHARED RADIO CELL

(71) Applicant: Telefonaktiebolaget L M Ericsson (publ), Stockholm (SE)

(72) Inventors: Ying Sun, Sundbyberg (SE); Jing Rao, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 15 days.

(21) Appl. No.: 14/317,871

(22) Filed: Jun. 27, 2014

(65) Prior Publication Data
US 2015/0009838 A1  Jan. 8, 2015

(30) Foreign Application Priority Data

Jul. 3, 2013 (EP) ..................................... 13174831

(51) Int. Cl.
| | | |
|---|---|---|
| *G01R 31/08* | (2006.01) | |
| *H04W 4/00* | (2009.01) | |
| *H04W 52/28* | (2009.01) | |
| *H04W 24/08* | (2009.01) | |
| *H04L 1/20* | (2006.01) | |
| *H04W 72/08* | (2009.01) | |
| *H04L 1/00* | (2006.01) | |
| *H04B 7/04* | (2017.01) | |
| *H04B 7/06* | (2006.01) | |

(52) U.S. Cl.
CPC ........ *H04W 52/281* (2013.01); *H04B 7/0486* (2013.01); *H04B 7/0632* (2013.01); *H04L 1/0026* (2013.01); *H04L 1/20* (2013.01); *H04W 24/08* (2013.01); *H04W 72/085* (2013.01)

(58) Field of Classification Search
CPC .................................................... H04W 72/082
USPC ......................................................... 370/252
See application file for complete search history.

(56) References Cited

U.S. PATENT DOCUMENTS

| 8,948,085 B2* | 2/2015 | Barbieri | .............. | H04W 72/082 |
| | | | | 370/328 |
| 2009/0082027 A1* | 3/2009 | Yavuz | ................ | H04W 72/082 |
| | | | | 455/446 |
| 2010/0091678 A1 | 4/2010 | Chen et al. | | |
| 2011/0034175 A1* | 2/2011 | Fong | ..................... | H04B 7/024 |
| | | | | 455/450 |

(Continued)

OTHER PUBLICATIONS

Extended European Search Report issued by the EPO for Application No./Patent No. 13174831.1-1858, Dec. 20, 2013.

(Continued)

*Primary Examiner* — Gerald Smarth
(74) *Attorney, Agent, or Firm* — Baker Botts, LLP

(57) ABSTRACT

The present disclosure concerns radio communication. In one of its aspects, the technology presented herein concerns a method performed by a base station 210 for selecting a transmission rank. The method may advantageously be carried out when the base station 210 is operating in a shared cell 200. The base station receives a channel-state report from a user equipment. Also, a channel quality parameter is estimated by the base station 210. Furthermore, the base station 210 selects the transmission rank (e.g. transmission rank 1 or transmission rank 2) on the basis of the received channel-state report as well as the estimated channel quality parameter.

12 Claims, 6 Drawing Sheets

(56) References Cited

U.S. PATENT DOCUMENTS

| | | | |
|---|---|---|---|
| 2011/0237282 A1* | 9/2011 | Geirhofer | H04B 7/024 455/509 |
| 2011/0263281 A1* | 10/2011 | Cai | H04B 7/0404 455/501 |
| 2011/0268100 A1* | 11/2011 | Gorokhov | H04B 7/024 370/342 |
| 2011/0275403 A1* | 11/2011 | Chen | H04W 52/146 455/522 |
| 2012/0122472 A1* | 5/2012 | Krishnamurthy | H04L 5/0053 455/456.1 |
| 2013/0058307 A1* | 3/2013 | Kim | H04B 7/024 370/329 |
| 2014/0056374 A1* | 2/2014 | Goransson | |

OTHER PUBLICATIONS

3GPP 3rd Generation Partnership Project; Technical Specification Group Radio Access Network; Evolved Universal Terrestrial Radio Access (E-UTRA); Multiplexing and channel coding (Release 12), 2013.

3GPP 3rd Generation Partnership Project; Technical Specification Group Radio Access Network; Evolved Universal Terrestrial Radio Access (E-UTRA); Physical layer procedures (Release 12), 2014.

* cited by examiner

TRANSMISSION RANK SELECTION WHEN DEPLOYING A SHARED RADIO CELL

TECHNICAL FIELD

Embodiments of the present invention presented herein generally relate to radio communication. More particularly, the embodiments presented herein generally relate to channel state reporting and transmission rank selection based on such reporting when deploying a shared radio cell.

BACKGROUND

This section is intended to provide a background to the various embodiments of the invention that are described in this disclosure. The description herein may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In the $3^{rd}$ Generation Partner Project (3GPP) Long Term Evolution (LTE) system, Multiple Input Multiple Output (MIMO) techniques, such as open-loop and close-loop spatial multiplexing, are introduced to improve spectrum efficiency and network capacity. For these transmission modes (e.g. TM3, TM4 and TM8 in 3GPP Release-9), single layer or multiple layers can be applied based on a radio channel's quality and rank.

Rank generally represents the number of transmission layers for wireless communication between a base station (e.g., an evolved Node B (eNB)) and a user equipment (UE) in a MIMO system. Taking rank 1 and rank 2 downlink transmission as an example, the rank 1 represents that the base station transmits downlink data to the UE by using a single layer, where the same data is transmitted via two different transmitting antennas of the base station to achieve space diversity; while the rank 2 represents that the base station transmits downlink data to the UE by using two different layers via the two different transmitting antennas to achieve space multiplexing.

Rank adaptation relates to flexibly selecting, from a plurality of ranks allowed by the corresponding transmission mode, a rank for wireless communication between the base station and the UE. Throughput for the UE would be maximized if the rank is selected properly at the eNB side to match well with the real channel condition. Usually, the eNB may determine the rank by several approaches, some of which are described in the following to introduce aspects that may facilitate a better understanding of the embodiments of the invention described later in this disclosure.

In one approach, the eNB may simply follow rank indication (RI) included in the channel state information (CSI) report received from the UE so as to perform data transmission. As an example of such approach, Chinese Patent Publication No. CN 101998498A, entitled "Rank self-adapting method and rank self-adapting device", discloses a rank self-adapting solution, where a rank receiving unit is used for receiving reported ranks of UE within a rank receiving window; a rank decision unit is used for determining a rank of the current moment according to the distribution state in the rank receiving window and determining the number of independent channels for downlink data transmission according to the determined rank of the current moment. In another approach, the eNB may determine a rank according to a suitable parameter indicative of channel quality. For example, rank 1 is adopted if estimated channel quality is below a certain threshold, otherwise rank 2. The parameter indicative of channel quality can be derived from the CQI report received from the UE or outer-loop link adaptation results according to configured rules by the communication system. As an example of such an approach, Chinese Patent Publication No. CN 102035580A, entitled "Method for retreating rank in spatial multiplexing mode, base station and communication system", discloses a rank adaptation solution for retreating rank in a spatial multiplexing mode where a base station receives CQI and RI from a terminal; and when the RI is larger than 1, according to the CQI and preset threshold information, judging whether a downlink channel goes through deep fading with small scale, and if so, using a degraded value than the RI reported by the terminal as the current rank used by the base station. In still another approach, the eNB may estimate rank by sounding reference signal (SRS) or demodulation reference signal (DMRS) in uplink based on the uplink downlink channel reciprocity for a Time Division Duplex (TDD) system.

Classical Versus Shared Radio Cell Deployments

In the following, the term point is used to mean a point having transmission and/or reception capabilities. As used herein, this term may interchangeably be referred to as "transmission point", "reception point" or "transmission/reception point". To this end, it should also be appreciated that the term point may include devices such as base stations (e.g. eNBs) and radio units (e.g. Remote Radio Units (RRUs)). As is known among persons skilled in the art, base stations generally differ from RRUs in that the base stations have comparatively more controlling functionality. For example, base stations typically include scheduler functionality, etc., whereas RRUs typically don't. Therefore, RRUs are typically consuming comparatively less computational power than base stations. Sometimes, base stations may therefore be referred to as high power points whereas RRUs may be referred to as low power points. In some cell deployments, low power points are referred to as pico points and high power points are referred to as macro points. Thus, macro points are points having comparatively higher power than the pico points.

The classical way of deploying a network is to let different transmission/reception points form separate cells. That is, the signals transmitted from or received at a point is associated with a cell-id (e.g. a Physical Cell Identity (PCI)) that is different from the cell-id employed for other nearby points. Conventionally, each point transmits its own unique signals for broadcast (PBCH (Physical Broadcast Channel)) and sync channels (PSS (primary synchronization signal), SSS (secondary synchronization signal)). The classical way of utilizing one cell-id per point is depicted in FIG. 1 for a heterogeneous deployment where a number of low power pico points are placed within the coverage area of a higher power point. Note that similar principles also apply to classical macro-cellular deployments where all points have similar output power and perhaps are placed in a more regular fashion compared with the case of a heterogeneous deployment.

A recent alternative to the classical cell deployment is to instead let all the UEs within the geographical area outlined by the coverage of the high power point be served with signals associated with the same cell-id (e.g. the same Physical Cell Identity (PCI)). In other words, from a UE perspective, the received signals appear coming from a single cell. This is illustrated in FIG. 2. Note that only one macro point is shown, other macro points would typically use different cell-ids (corresponding to different cells) unless they are co-located at the same site (corresponding to other sectors of the macro site). In the latter case of several co-located macro points, the same cell-id may be shared across the co-located macro points and those pico points that correspond to the union of the coverage areas of the macro points. Sync channels, BCH (Broadcast Channels) and control channels and CRS (Cell Reference Signal) may all be transmitted from the high power point while data can be transmitted to a UE also from low power points by using shared data transmissions (e.g. a Physical Downlink Shared Channel (PDSCH)) relying on UE specific resources. Such an approach has benefits for those UEs that are capable of PDSCH based on UE specific resources while UEs only supporting CRS for PDSCH (which is likely to at least include all Release 8/9 UEs for Frequency Division Duplex (FDD)) has to settle with the transmission from the high power point and thus will not benefit in the downlink from the deployment of extra low power points. In FIG. 2, the high power point may be a base station such as an eNB. The low power points may be radio units such as those commonly referred to as Remote Radio Units (RRUs).

The single cell-id approach can be geared towards situations in which there is fast backhaul communication between the points associated to the same cell. A typical case would be a base station serving one or more sectors on a macro level as well as having fast fiber connections to remote radio units (RRUs) playing the role of the other points sharing the same cell-id. Those RRUs could represent low power points with one or more antennas each. Another example is when all the points have a similar power class with no single point having more significance than the others. The base station would then handle the signals from all RRUs in a similar manner.

An advantage of the shared cell approach compared with the classical approach is that the typically involved handover procedure between cells only needs to be invoked on a macro basis. Another advantage is that interference from Cell specific Reference Symbols (CRS) can be greatly reduced since CRS does not have to be transmitted from every point. There is also greater flexibility in coordination and scheduling among the points which means the network can avoid relying on the inflexible concept of semi-statically configured "low interference" subframes as in Rel-10. A shared cell approach also allow decoupling of the downlink (DL) with the uplink (UL) so that for example path loss based reception point selection can be performed in UL while not creating a severe interference problem for the DL, where the UE may be served by a transmission point different from the point used in the UL reception.

SUMMARY

It is in view of the above considerations and others that the various embodiments disclosed herein have been made.

The inventors have realized that currently available solutions for transmission rank selection, or transmission rank adaptation, may not be sufficiently accurate when employing a shared cell approach. When employing a shared cell approach as described in the background not only the UL and DL transmission may be decoupled, but also the DL control channel transmissions and DL data channel transmissions may be decoupled. As is schematically illustrated in FIG. 2, a control channel may be transmitted from the higher power point (e.g. eNB) while data may be transmitted to a UE also from lower power points (e.g. RRUs) by using shared data transmissions (e.g. a Physical Downlink Shared Channel (PDSCH)) relying on UE specific resources. The inventors have realized that this decoupling of DL control channel transmissions and DL data channel transmissions may lead to inaccurate, or erroneous, channel quality estimations. This is inter alia because the channel estimation for the data channel is generally performed based on a measurement on the Cell Reference Signal (CRS) carried on the control channel, which might use different transmission points than the data channel(s). This could mean different transmit powers and different fading characteristics and, consequently, the UE channel quality estimation does not necessarily reflect the actual quality of the data channel. In prior art solutions, it has been proposed to utilize outer-loop adjustments to compensate for channel quality estimation errors. However, the inventors have realized that such compensation solution on its own may not be sufficient in shared cell deployments. For example, when there is bursty radio traffic with small packet sizes, the outer loop adjustments might be too slow to converge to a correct value.

It is therefore an aim to provide an alternative, or improved, way of selecting a transmission rank when employing a shared cell. The various embodiments of the present invention as set forth in the appended independent claims address this general aim. The appended dependent claims represent additional advantageous embodiments of the present invention.

In one of its aspects, the technology presented herein concerns a method performed by a base station (e.g. a eNB) for selecting a transmission rank. The base station is serving a first radio cell and is operating in a shared radio cell environment. A single physical-layer cell identity (PCI) may be shared among the base station and one or several radio units (e.g. RRUs) serving other radio cell(s). The base station and the radio units may be transmission points serving one or several user equipments (UEs) in respective radio cells utilizing said single PCI.

The method comprises receiving a channel-state report (aka channel state information report) from a UE. The channel-state report may comprise one or more of the following: a Channel Quality Indicator (CQI), a Rank Indicator (RI), and a Pre-coder Matrix Indicator (PMI). Furthermore, a channel quality parameter is estimated. The estimated channel quality parameter reflects a relation ($\Delta$) between estimated receive power on a data channel allocated to the UE and estimated receive power on a control channel allocated to the UE. Finally, the transmission rank is selected on the basis of the received channel-state report as well as the estimated channel quality parameter.

Consequently, the transmission rank selection not only takes information from the received channel-state report received from the UE into consideration. Also, the estimated channel quality parameter is taken count of. Any difference between control channel and data channel transmission points, e.g. due to the decoupling described hereinabove, may thus be taken into consideration when selecting (or, adapting) the transmission rank.

In one embodiment, estimating the channel quality parameter comprises deriving the relation ($\Delta$) between estimated receive power on said data channel and estimated receive power on said control channel from respective transmit powers of selected transmission points of said data channel and said control channel, respectively. For example, deriving the relation ($\Delta$) between estimated receive power on said data channel and estimated receive power on said control channel from selected transmission points of said data channel (Sd) and said control channel (Sc), respectively, may comprise: i) collecting data related to the respective transmit powers ($P_i$) of the selected transmission points of said data channel and said control channel, respectively, ii) for each transmit power, calculating a product from the transmit power ($P_i$) multiplied by a respective path gain ($G_i$), iii) calculating a sum ($\Sigma_{i \in Sd} Gi \times Pi$) of all products related to said data channel, iv) calculating a sum ($\Sigma_{i \in Sc} Gi \times Pi$) of all products related to said control channel, v) calculating a quotient $$\left( \frac{\sum_{i \in Sd} Gi \times Pi}{\sum_{i \in Sc} Gi \times Pi} \right)$$

from the sum ($\Sigma_{i \in Sd} Gi \times Pi$) of all products related to said data channel and the sum ($\Sigma_{i \in Sc} Gi \times Pi$) of all products related to said control channel. In one embodiment, deriving the relation ($\Delta$) between estimated receive power on said data channel and estimated receive power on said control channel from selected transmission points of the data channel (Sd) and the control channel (Sc), comprises calculating said relation ($\Delta$) utilizing the following formula:

$$\Delta = 10 \log_{10} \left( \frac{\sum_{i \in Sd} Gi \times Pi}{\sum_{i \in Sc} Gi \times Pi} \right).$$

In some embodiments, estimating the channel quality parameter comprises estimating a Signal to Interference plus Noise Ratio (SINR). The estimation of the SINR also reflects said relation ($\Delta$) between estimated receive power on said data channel and estimated receive power on said control channel.

For example, in one example embodiment, estimating the SINR comprises: estimating the SINR according to the formula SINR=$PSD_{PDSCH}$+$GINR_{est}$+OL+$\Delta$. In this formula $PSD_{PDSCH}$ represents a power spectral density for Physical Downlink Shared Channel (PDSCH) elements in Orthogonal Frequency Division Muliplexing (OFDM) elements without reference symbols. Furthermore, $GINR_{est}$ represents a Gain-to-Interference Ratio e.g. mapped from the received channel-state report from the UE. OL represents an outer loop adjustment. Moreover, $\Delta$ quantifies the relation ($\Delta$) between estimated receive power on said data channel and estimated receive power on said control channel.

The method may additionally comprise comparing the estimated SINR with a threshold value. A first transmission rank (e.g. transmission rank 1) is selected when the estimated SINR is below said threshold value, and a second transmission rank (e.g. transmission rank 2) is selected when the estimated SINR is equal to or above said threshold value. The threshold value may be tested and evaluated in each case depending on e.g. certain network requirements, operator requirements, etc. For example, the threshold value may be any of the following values: 3 decibel (dB), 4 dB, 5 dB, 6 dB, 7 dB.

In another of its aspects, the technology herein concerns a base station for selecting a transmission rank. The base station is configured to serve a first radio cell and is configured to operate in a shared radio cell environment. For example, a single physical-layer cell identity (PCI) is shared among the base station and one or several radio units configured to serve one or several other radio cells. The base station and the radio units may be transmission points serving one or several user equipments (UEs) in respective radio cells utilizing said single PCI.

The base station may be an eNB. The radio units may be radio units, such as RRUs.

The above-mentioned base station comprises a receiver configured to receive a channel-state report from a UE. The base station further comprises a processor and a memory. The memory stores computer program code which, when run in the processor, causes the base station to estimate a channel quality parameter which reflects a relation ($\Delta$) between estimated receive power on a data channel allocated to the user equipment and estimated receive power on a control channel allocated to the user equipment, and to select the transmission rank on the basis of the received channel-state report as well as the estimated channel quality parameter.

The memory and the computer program code may also be configured to, together with the processor, derive the relation ($\Delta$) between estimated receive power on said data channel and estimated receive power on said control channel from respective transmit powers of selected transmission points of said data channel and said control channel, respectively.

The various embodiments described herein may provide several advantages. The embodiments of the present invention provide a solution where an estimated channel quality parameter reflects a relation between estimated receive power on a data channel allocated to the UE and estimated receive power on a control channel allocated to the UE and where the transmission rank selection is based on such estimated channel quality parameter in addition to information received in the channel-state-report. This may allow for improved transmission rank selections, or transmission rank adaptations, in scenarios where DL control channel transmissions and DL data channel transmissions are decoupled, such as in shared cell deployments.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The invention will now be described more fully hereinafter with reference to the accompanying drawings, in which certain embodiments are shown. The invention may, however, be embodied in many different forms and should not be construed as limited to the embodiments set forth herein; rather, these embodiments are provided by way of example so that this disclosure will be thorough and complete, and will fully convey the scope of the technology to those persons skilled in the art. Like reference numbers refer to like elements or method steps throughout the description.

Figure 1:
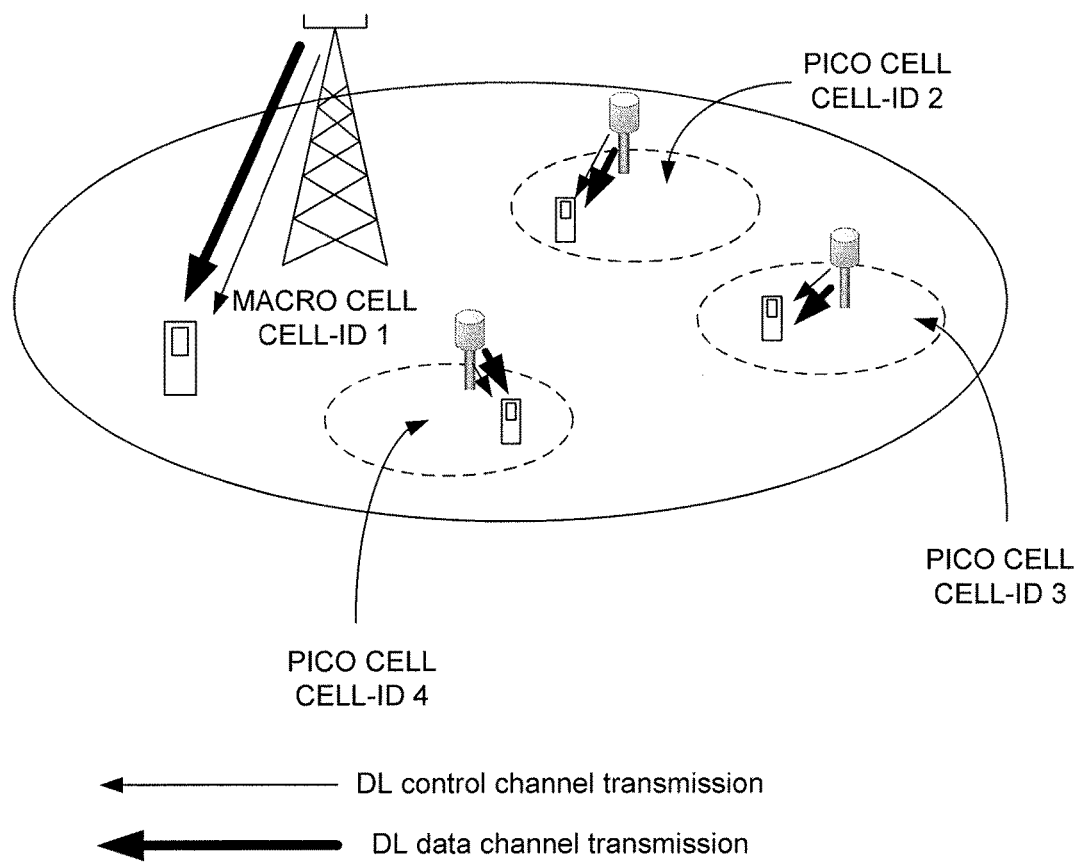
FIG. 1 shows an example of a heterogeneous radio network utilizing a classical cell deployment.
Figure 2:
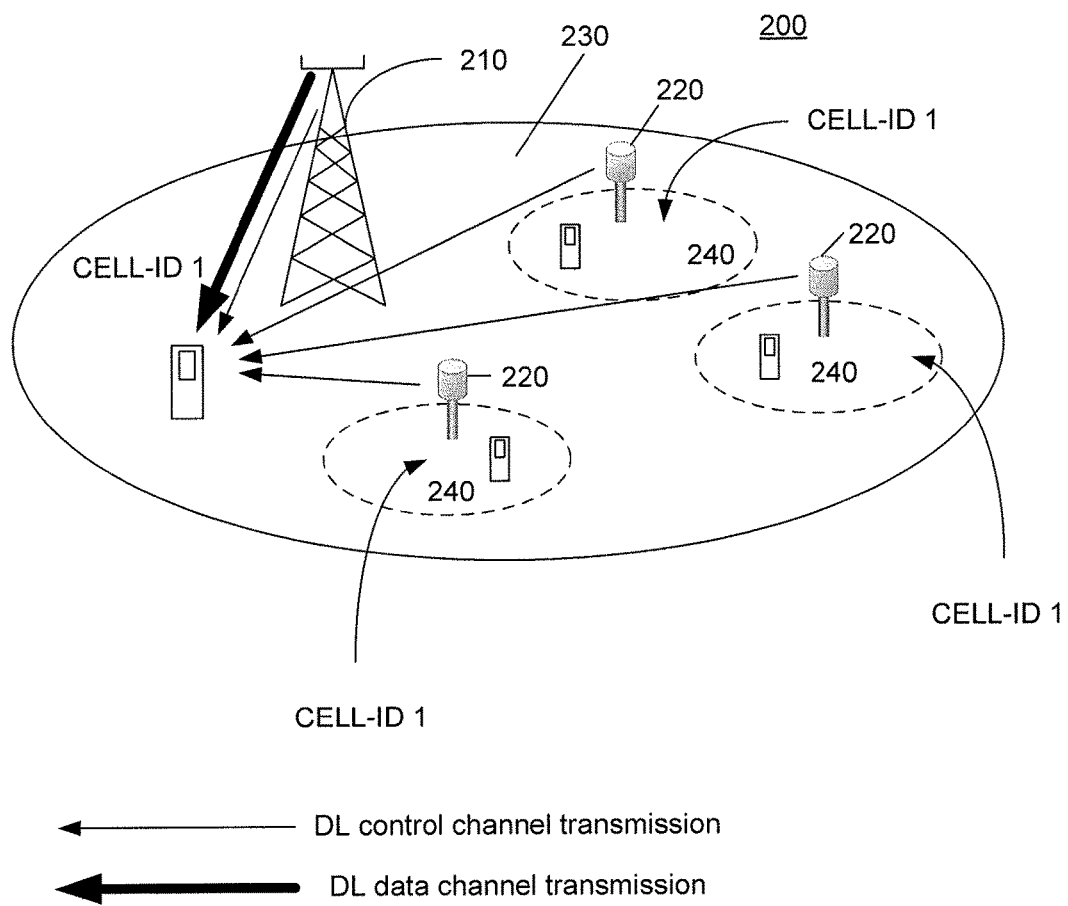
FIG. 2 shows an example of a radio network utilizing a shared cell deployment.

In one of its aspects, the technology presented herein concerns a method performed by a base station (e.g. a eNB)

for selecting a transmission rank. The method may advantageously be carried out when the base station is operating in a shared cell, such as the shared cell environment 200 schematically illustrated in FIG. 2. In such shared cell environment 200, DL control channel transmissions and DL data channel transmissions may be decoupled as described earlier in this disclosure. In FIG. 2, this is illustrated by the different arrows. As can be seen in FIG. 2, DL control channel transmissions may be transmitted from the higher power point (i.e. the base station 210 in this example) while DL data transmissions can be transmitted also from the lower power points (e.g. embodied as radio units 220). In one example embodiment, the base station 400 is serving a first radio cell 230 and is operating in the shared radio cell environment 200. A single cell-ID (e.g. a physical-layer cell identity (PCI)) may be shared among the base station 210 and the one or several radio units 220 (e.g. RRUs) serving other radio cell(s) 240. As is known by persons skilled in the art, the radio cells denoted 240 in FIG. 2 are sometimes referred to as sectors, because these radio cells could be seen as sectors of the radio cell denoted 230. The base station 210 and the radio units 220 may be transmission points serving one or several UEs in respective radio cells 230, 240 utilizing the same cell-id (e.g. the same PCI). As used in this disclosure, the term "user equipment (UE)" is used to mean any device, which can be used by a user to communicate. Also, the term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE includes MTC devices, which do not necessarily involve human interaction. In this regard, it should also be appreciated that the term "user equipment (UE)" as used herein may apply the definition as specified on page 33 of 3GPP TR 21.905 V.12.0.0 (2013-06).

Figure 3B:
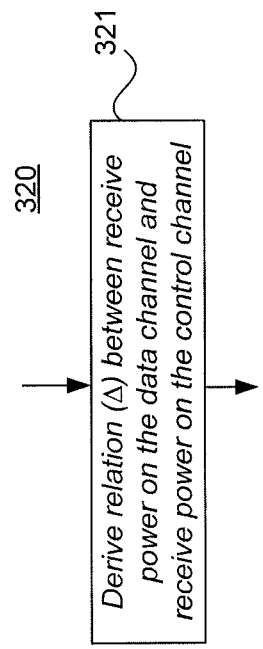
FIGS. 3A-D shows flowcharts of example methods performed by a base station.
Figure 3A:
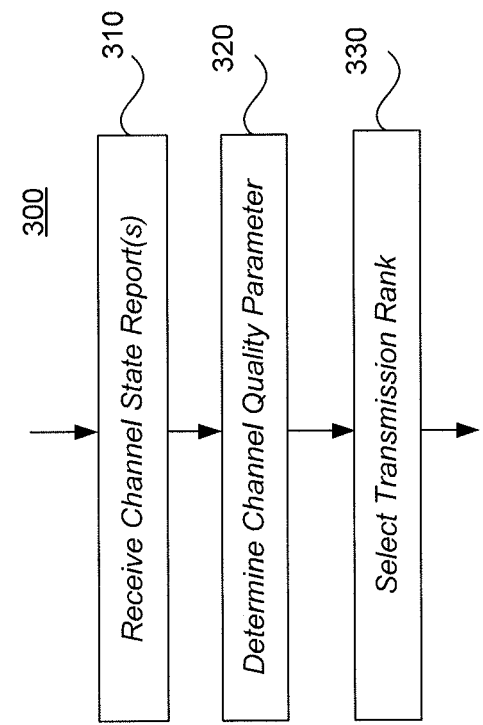

Reference is now made to FIG. 3A, which illustrates an example method according to one embodiment of the invention. The method 300 is performed by, or otherwise implemented in, a base station. As used in this disclosure, the term "base station" generally denotes a point being capable of communicating with one or several UE(s). As such, it should be appreciated that the term "base station" as used herein may apply the definition as specified on page 8 of 3GPP TR 21.905 V.12.0.0 (2013-06). The base station may also be referred to as a Radio Base Station (RBS), a NodeB, an evolved NodeB (eNB), etc.

The method 300 comprises receiving 310 a channel-state report (also known as channel-state information report) from a UE. The channel-state report may comprise one or more of the following: a Channel Quality Indicator (CQI), a Rank Indicator (RI), and a Pre-coder Matrix Indicator (PMI). Furthermore, a channel quality parameter is estimated 320. The estimated channel quality parameter reflects a relation ($\Delta$) between estimated receive power on a data channel allocated to the UE and estimated receive power on a control channel allocated to the UE. Subsequently, the transmission rank is selected 330 on the basis of the channel-state report received 310 from the UE as well as the channel quality parameter that has been estimated 320 by the base station.

As can be seen in FIG. 3B, the estimation 320 of the channel quality parameter may advantageously comprise deriving 321 the relation ($\Delta$) between estimated receive power on said data channel and estimated receive power on said control channel from selected transmission points of said data channel (hereinafter also denoted Sd) and said control channel (hereinafter also denoted Sc), respectively. The "S" in "Sc" stands for "selected sector or selected set of sectors" for the control channel(s) that is used to for channel quality estimation. The "S" in "Sd" stands for "selected sector or selected set of sectors" for the data channel(s).

Figure 3C:
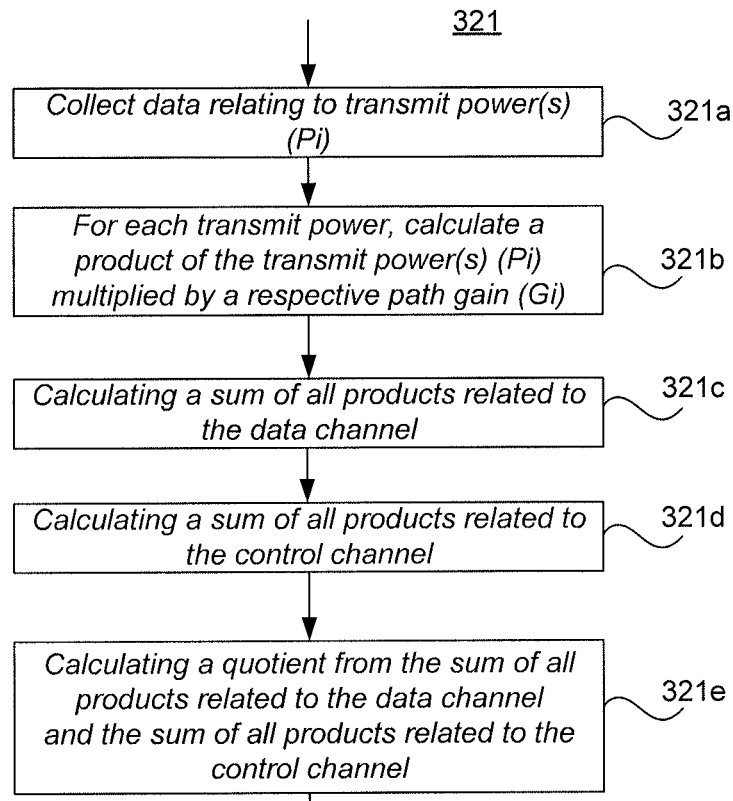

Turning now to FIG. 3C, the deriving 321 of the relation ($\Delta$) between estimated receive power on said data channel and estimated receive power on said control channel from selected transmission points of said data channel (hereinafter denoted Sd) and said control channel (hereinafter denoted Sc), respectively, may optionally comprise the following acts or steps:

321*a*: collect data related to the respective transmit powers ($P_i$) of the selected transmission points of said data channel and said control channel, respectively;

321*b*: for each transmit power, calculate a product from the transmit power ($P_i$) multiplied by a respective path gain ($G_i$);

321*c*: calculate a sum ($\Sigma_{i \in Sd} Gi \times Pi$) of all products related to said data channel;

321*d*: calculate a sum ($\Sigma_{i \in Sc} Gi \times Pi$) of all products related to said control channel;

321*e*: calculate a quotient $$\left( \frac{\sum_{i \in Sd} Gi \times Pi}{\sum_{i \in Sc} Gi \times Pi} \right)$$

from the sum ($\Sigma_{i \in Sd} Gi \times Pi$) of all products related to said data channel and the sum ($\Sigma_{i \in Sc} Gi \times Pi$) of all products related to said control channel.

It should be appreciated that the above-mentioned steps 321*a* through 321*e* do not have to be performed in the exact order outlined above. As a mere example, 321*d* could be performed prior to step 321*c*.

As will be understood, the quotient $$\frac{\sum_{i \in Sd} Gi \times Pi}{\sum_{i \in Sc} Gi \times Pi}$$

can be calculated. This quotient can then be used to represent the relation between estimated receive power on said data channel and estimated receive power on said control channel from selected transmission points of said data channel.

In one embodiment, deriving the relation ($\Delta$) between estimated receive power on said data channel and estimated receive power on said control channel from selected transmission points of the data channel (Sd) and the control channel (Sc), comprises calculating said relation ($\Delta$) utilizing the following formula:

$$\Delta = 10 \log_{10} \left( \frac{\sum_{i \in Sd} Gi \times Pi}{\sum_{i \in Sc} Gi \times Pi} \right). \quad \text{Formula 1}$$

It should be appreciated that there exist different ways of estimating the path gain $G_i$ mentioned hereinabove. Estimation can e.g. be made based on a SRS measurement or a PRACH measurement. Estimating a path gain $G_i$ from a SRS measurement or a PRACH measurement is known to persons skilled in the art and will therefore not be further detailed herein. As a mere example, $G_i$ may for instance be computed by dividing the measured received power on SRS with the transmit power of the UE used for SRS. The transmit power of the UE used for SRS is generally power controlled and also generally known by base station.

Figure 3D:
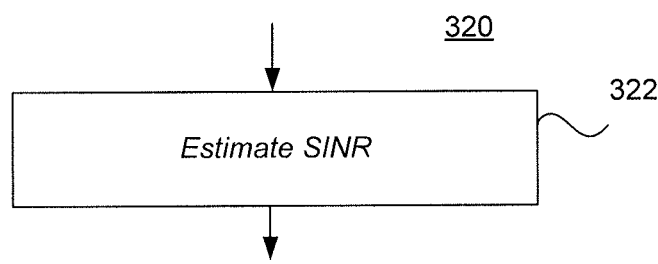

Turning now to FIG. 3D, the estimation 320 of the channel quality parameter in FIG. 3A comprises estimating 322 a Signal to Interference plus Noise Ratio (SINR). In this embodiment, the estimation of the SINR reflects the above-mentioned relation ($\Delta$) between estimated receive power on said data channel and estimated receive power on said control channel. For example, the estimation 322 of the SINR may comprise estimating the SINR according to the following formula:

$$\text{SINR} = \text{PSD}_{PDSCH} + \text{GINR}_{est} + \text{OL} + \Delta \qquad \text{Formula 2}$$

In this formula, $\text{PSD}_{PDSCH}$ represents a power spectral density for PDSCH elements in OFDM elements without reference symbols. In other words, $\text{PSD}_{PDSCH}$ represents the transmit power density of PDSCH decided by the base station. $\text{GINR}_{est}$ represents a Gain-to-Interference Ratio e.g. mapped from the received channel-state report from the UE. The base station may calculate, or compute, the $\text{GINR}_{est}$ based on information received in the channel-state report. The CQI comprised in the channel-state report generally comprises the necessary, or relevant, information for the calculation of the $\text{GINR}_{est}$, e.g. received SINR. Also, the base station stores information, or data, about the transmit power of previous transmissions. Then, the base station can e.g. utilize the following formula:

$$\text{GINR} = \text{SINR}_{(PREVIOUS)} / \text{PSD}_{PDSCH(PREVIOUS)} \qquad \text{Formula 3}$$

GINR can also be further filtered to get $\text{GINR}_{est}$. OL represents an outer loop adjustment. For example, the base station may estimate the OL based on received ACK (i.e. acknowledgement) and/or NACK (i.e. negative acknowledgement) messages For example, when an ACK message is received, OL is generally increased with an offset that is used for increasing the gain. When a NACK is received, OL is generally decreased with an offset that is used for decreasing the gain. Both offsets are generally decided by the base station. Finally, $\Delta$ quantifies the earlier-mentioned relation ($\Delta$) between estimated receive power on said data channel and estimated receive power on said control channel.

Figure 5:
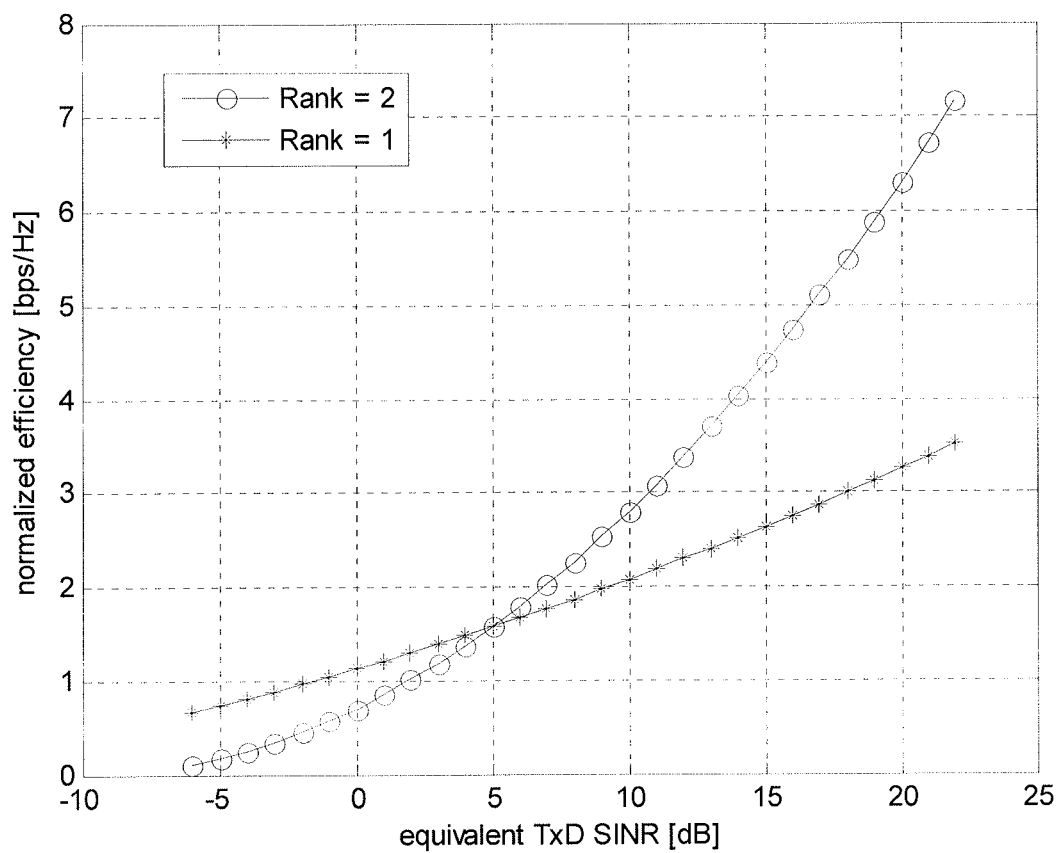
FIG. 5 shows an illustration of a determination of a threshold value in one of the embodiments of the invention.

The SINR that is estimated may be compared with a threshold value. In one embodiment, a first transmission rank (e.g. transmission rank 1, see e.g. the Technical Specification 3GPP TS 36.213, Chapter 7) is selected 330 by the base station when the estimated SINR is below said threshold value. A second transmission rank (e.g. transmission rank 2, see e.g. the Technical Specification 3GPP TS 36.213, Chapter 7) is selected when the estimated SINR is equal to or above said threshold value. FIG. 5 illustrates one example embodiment where the threshold value has been chosen to be five dB. In this embodiment, when the estimated SINR is below five dB the first transmission rank is selected by the base station. On the other hand, when the estimated SINR is equal to or above 5 dB, the second transmission rank is selected by the base station. It will come to mind to one skilled in the art having benefit of the teachings presented here that other threshold values can equally possible be used. For example, in other embodiments the threshold value can be set to three, four, six, or seven dB to name only a few examples. The exact value of the threshold value should thus be tested and evaluated in each specific case in order to meet various demands, e.g. operator demands and/or end-user experience demands.

It will come to mind to one skilled in the art having benefit of the teachings presented in the foregoing description with respect to FIG. 3 that other SINR estimations could also be applied. That is, it is not necessary to make use of the above-referenced formula 2. What is important is that any SINR estimation takes the relation ($\Delta$) between estimated receive power on said data channel and estimated receive power on said control channel into consideration.

Figure 4:
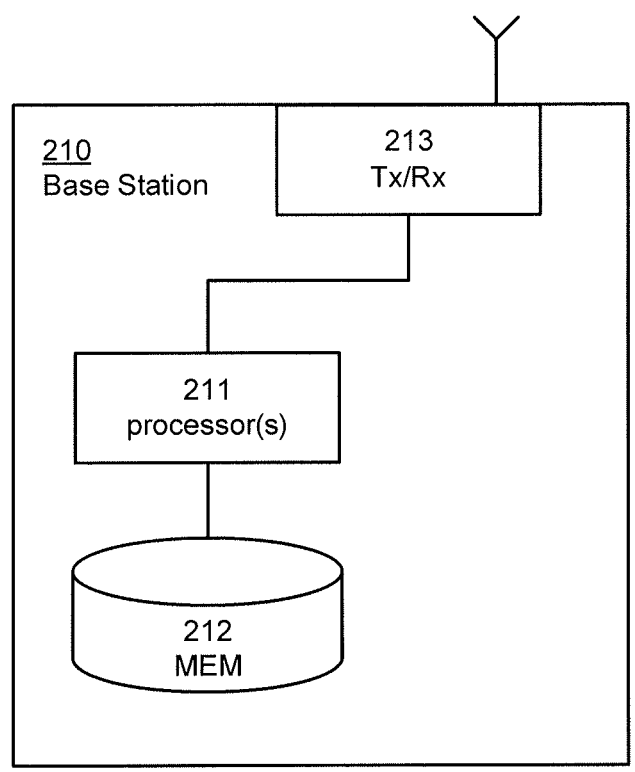
FIG. 4 shows an example implementation of a base station.

The methods described with respect to FIGS. 3A-3D may be implemented in a base station 210, such as an eNB. The base station 210 is configured to serve a first radio cell 230 (see FIG. 2). The base station 210 is also configured to operate in a shared radio cell environment 200 (see FIG. 2). A single cell-id, such as a PCI, can be shared among the base station 210 and radio units 220, such as RRUs, of the shared cell environment 200. FIG. 4 provides an example embodiment of the base station 210. The base station 210 includes a one or more processors 211, one or more memories 212 and a transmitter (Tx)/receiver (Rx) module 213. The transmitter/receiver module 213 may comprise one or more transmitters and/or one or more receivers.

Alternatively, the transmitter/receiver module 213 can be embodied as a transceiver module, which has both transmission and reception capabilities.

A receiver 213 is configured to receive a channel-state report from a UE. Also, the memory 212 stores computer program code which, when run in the processor 211, causes the base station 210 to estimate a channel quality parameter which reflects a relation ($\Delta$) between estimated receive power on a data channel allocated to the user equipment and estimated receive power on a control channel allocated to the user equipment. Also, the memory 212 stores computer program code which, when run in the processor 211, causes the base station 210 to select the transmission rank (e.g. transmission rank 1 or transmission rank 2) on the basis of the received channel-state report as well as the estimated channel quality parameter.

In one embodiment, the memory 212 and the computer program code are further configured to, together with the processor 211, derive the relation ($\Delta$) between estimated receive power on said data channel and estimated receive power on said control channel from respective transmit powers of selected transmission points of said data channel and said control channel, respectively.

In one embodiment, the memory 212 and the computer program code are further configured to, together with the processor 211, collect data related to the respective transmit powers ($P_i$) of the selected transmission points of said data channel and said control channel, respectively; for each transmit power, calculate a product from the transmit power ($P_i$) multiplied by a respective path gain ($G_i$); calculate a sum ($\Sigma_{i \in Sd} Gi \times Pi$) of all products related to said data channel; calculate a sum ($\Sigma_{i \in Sc} Gi \times Pi$) of all products related to said control channel; and calculate a quotient $$\left( \frac{\sum_{i \in Sd} Gi \times Pi}{\sum_{i \in Sc} Gi \times Pi} \right)$$

from the sum ($\Sigma_{i \in Sd} Gi \times Pi$) of all products related to said data channel and the sum ($\Sigma_{i \in Sc} Gi \times Pi$) of all products related to said control channel. In one embodiment, the calculation of the quotient could be according to:

$$\Delta = 10\log_{10}\left(\frac{\sum_{i\in Sd} Gi \times Pi}{\sum_{i\in Sc} Gi \times Pi}\right).$$

In one embodiment, the memory 212 and the computer program code are further configured to, together with the processor 211, estimate a SINR, wherein the estimation of the SINR reflects said relation ($\Delta$) between estimated receive power on said data channel and estimated receive power on said control channel. In one example embodiment, the SINR estimation may be performed according to the formula: SINR=$PSD_{PDSCH}$+$GINR_{est}$+OL+$\Delta$. The formula has been described earlier and will therefore not be repeated here.

In one embodiment, the memory 212 and the computer program code are further configured to, together with the processor 211, compare the estimated SINR with a threshold value, select a first transmission rank (e.g. transmission rank 1) when the estimated SINR is below said threshold value, and select a second transmission rank (e.g. transmission rank 2) when the estimated SINR is equal to or above said threshold value.

The various embodiments described in this disclosure provide a solution where an estimated channel quality parameter reflects a relation between estimated receive power on a data channel allocated to the UE and estimated receive power on a control channel allocated to the UE and where the transmission rank selection is based on such estimated channel quality parameter in addition to information received in the channel-state-report. This may allow for improved transmission rank selections, or transmission rank adaptations, in scenarios where DL control channel transmissions and DL data channel transmissions are decoupled, such as in shared cell deployments.

In the detailed description hereinabove, for purposes of explanation and not limitation, specific details are set forth such as particular architectures, interfaces, techniques, etc. in order to provide a thorough understanding of various embodiments of the present invention. In some instances, detailed descriptions of well-known devices, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Although the present invention has been described above with reference to specific embodiments, it is not intended to be limited to the specific form set forth herein. For example, while the various embodiments have been described with respect to LTE, it will come to mind to one skilled in the art having benefit of the teachings presented in the foregoing description and associated drawings that the embodiments presented herein can equally possible be used in other 3GPP standards or other wireless technologies. Consequently, the invention is limited only by the accompanying claims and other embodiments than the specific above are equally possible within the scope of the appended claims. Also, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A method performed by a base station for selecting a transmission rank, wherein the base station is serving a first radio cell and is operating in a shared radio cell environment where a single physical-layer cell identity (abbreviated PCI) is shared among the base station and radio units serving other radio cells, and wherein the base station and the radio units are transmission points serving one or several user equipments in respective radio cells utilizing said single PCI, the method comprising:
   receiving a channel-state report from a user equipment;
   estimating a channel quality parameter, which reflects a relation ($\Delta$) between estimated receive power on a data channel allocated to the user equipment and estimated receive power on a control channel allocated to the user equipment; and
   selecting the transmission rank on the basis of the received channel-state report as well as the estimated channel quality parameter.

2. The method according to claim 1, wherein estimating the channel quality parameter comprises:
   deriving the relation ($\Delta$) between estimated receive power on said data channel and estimated receive power on said control channel from respective transmit powers of selected transmission points of said data channel and said control channel, respectively.

3. The method according to claim 2, wherein deriving the relation ($\Delta$) between estimated receive power on said data channel and estimated receive power on said control channel from selected transmission points of said data channel (Sd) and said control channel (Sc), respectively, comprises:
  collecting data related to the respective transmit powers ($P_i$) of the selected transmission points of said data channel and said control channel, respectively;
  for each transmit power, calculating a product from the transmit power ($P_i$) multiplied by a respective path gain ($G_i$);
  calculating a sum ($\Sigma_{i \in Sd}$Gi×Pi) of all products related to said data channel;
  calculating a sum ($\Sigma_{i \in Sc}$ Gi×Pi) of all products related to said control channel;
  calculating a quotient $$\left( \frac{\sum_{i \in Sd} Gi \times Pi}{\sum_{i \in Sc} Gi \times Pi} \right)$$

from the sum ($\Sigma_{i \in Sd}$ Gi×Pi) of all products related to said data channel and the sum ($\Sigma_{i \in Sc}$ Gi×Pi) of all products related to said control channel.

4. The method according to claim 3, wherein deriving the relation ($\Delta$) between estimated receive power on said data channel and estimated receive power on said control channel from selected transmission points of the data channel (Sd) and the control channel (Sc), comprises calculating said relation ($\Delta$) utilizing the following formula:

$$\Delta = 10 \log_{10} \left( \frac{\sum_{i \in Sd} Gi \times Pi}{\sum_{i \in Sc} Gi \times Pi} \right).$$

5. The method according to claim 1, wherein estimating the channel quality parameter comprises:
  estimating a Signal-to-Interference Ratio, SINR, wherein the estimation of the SINR reflects said relation ($\Delta$) between estimated receive power on said data channel and estimated receive power on said control channel.

6. The method according to claim 5, wherein estimating the SINR comprises: estimating the SINR according to the formula SINR=$PSD_{PDSCH}$+$GINR_{est}$+OL+$\Delta$; wherein
  $PSD_{PDSCH}$ represents a power spectral density for Physical Downlink Shared Channel, PDSCH, elements in Orthogonal Frequency Division Muliplexing, OFDM, elements without reference symbols;
  $GINR_{est}$ represents a Gain-to-Interference Ratio mapped from the received channel-state report from the user equipment;
  OL represents a outer loop adjustment; and wherein
  $\Delta$ quantifies the relation ($\Delta$) between estimated receive power on said data channel and estimated receive power on said control channel.

7. The method according to claim 5, comprising:
  comparing the estimated SINR with a threshold value; and
  selecting a first transmission rank when the estimated SINR is below said threshold value; and
  selecting a second transmission rank when the estimated SINR is equal to or above said threshold value.

8. The method according to claim 7, wherein the threshold value is approximately five decibel.

9. The method according to claim 1, wherein receiving a channel-state report from the user equipment comprises receiving one or more of the following: a Channel Quality Indicator, CQI; a Rank Indicator, RI; and a Pre-coder Matrix Indicator, PMI.

10. A base station for selecting a transmission rank, wherein the base station is configured to serve a first radio cell and is configured to operate in a shared radio cell environment where a single physical-layer cell identity (PCI) is shared among the base station and radio units configured to serve other radio cells, and wherein the base station and the radio units are transmission points configured to serve one or several user equipments in respective radio cells utilizing said single PCI, the base station comprising:
  a receiver configured to receive a channel-state report from a user equipment;
  a processor; and
  a memory storing computer program code which, when run in the processor causes the base station to estimate a channel quality parameter which reflects a relation between estimated receive power on a data channel allocated to the user equipment and estimated receive power on a control channel allocated to the user equipment, and to select the transmission rank on the basis of the received channel-state report as well as the estimated channel quality parameter.

11. The base station according to claim 10, wherein the memory and the computer program code are configured to, together with the processor, derive the relation ($\Delta$) between estimated receive power on said data channel and estimated receive power on said control channel from respective transmit powers of selected transmission points of said data channel and said control channel, respectively.

12. The base station according to claim 10, wherein the base station is an evolved NodeB.

* * * * *